(12) United States Patent
Northrop et al.

(10) Patent No.: US 10,850,588 B2
(45) Date of Patent: Dec. 1, 2020

(54) AUTOMATED PASSENGER COUNTER SYSTEMS AND METHODS

(71) Applicant: Regents of the University of Minnesota, Minneapolis, MN (US)

(72) Inventors: William Northrop, Minneapolis, MN (US); David Kittelson, Minneapolis, MN (US); Andrew Kotz, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 267 days.

(21) Appl. No.: 15/252,705

(22) Filed: Aug. 31, 2016

(65) Prior Publication Data

US 2017/0057316 A1    Mar. 2, 2017

Related U.S. Application Data

(60) Provisional application No. 62/212,083, filed on Aug. 31, 2015.

(51) Int. Cl.
*B60G 17/019*        (2006.01)
*G01G 19/415*        (2006.01)
(Continued)

(52) U.S. Cl.
CPC ........... *B60G 17/019* (2013.01); *B60G 17/02* (2013.01); *G01G 19/415* (2013.01); *G01G 19/42* (2013.01);
(Continued)

(58) Field of Classification Search
CPC .............. B60G 17/019; B60G 2300/14; B60G 2300/38; B60G 2800/202; B60G 2400/50;
(Continued)

(56) References Cited

U.S. PATENT DOCUMENTS 6,025,563 A    2/2000 Lesesky et al.
6,396,395 B1 *  5/2002 Zielinski ................. B60Q 1/50
                                                    180/271
(Continued)

FOREIGN PATENT DOCUMENTS

CN    202471205 U    10/2012
CN    202806554 U     3/2013
(Continued)

OTHER PUBLICATIONS

"Passenger Counting Technologies and Procedures," Boyle, 1998. (Year: 1998).*
(Continued)

*Primary Examiner* — Benjamin R Schmitt
(74) *Attorney, Agent, or Firm* — Dicke, Billig & Czaja, PLLC

(57) ABSTRACT

APC systems and methods using vehicle mass to assess boardings and alightings of passengers on transit vehicles (e.g., buses). Vehicle mass is determined based on signaled information indicative of a pressure in one or more air bag circuits of an air ride suspension system of the vehicle. In some embodiments, pressure information from three air bag circuits of the vehicle are monitored and reviewed to determine vehicle mass. The passenger count can be estimated based on determined vehicle mass by an Additional Mass Method or an Event-Based Method for example.

14 Claims, 10 Drawing Sheets

(51) Int. Cl.
*G01G 19/42* (2006.01)
*B60G 17/02* (2006.01)

(52) U.S. Cl.
CPC .............. *B60G 2400/51222* (2013.01); *B60G 2400/62* (2013.01)

(58) Field of Classification Search
CPC .... B60G 2400/62; G01G 19/02; G01G 19/08; G01G 19/415; G01G 19/42
USPC ..................... 73/865; 280/6.15, 6.151, 6.152
See application file for complete search history.

(56) References Cited

U.S. PATENT DOCUMENTS

| 7,787,656 B2 | 8/2010 | Chen |
| 2003/0179127 A1 | 9/2003 | Wienand |
| 2007/0078691 A1* | 4/2007 | Wakabayashi ......... G06Q 10/02 705/5 |
| 2009/0207049 A1* | 8/2009 | Liao ....................... G08G 1/123 340/988 |
| 2013/0015355 A1 | 1/2013 | Noone et al. |

FOREIGN PATENT DOCUMENTS

| CN | 202904715 U | 4/2013 |
| WO | 2012005670 A1 | 1/2012 |

OTHER PUBLICATIONS

J. Polgár et al., "Passenger number dependent traffic control in signalized intersections", Per. Pol. Civil Eng., 57/2 (2013) 201-210; doi: 10.3311/PPci.7175; http://periodicapolytechnica.org/ci; Creative Commons Attribution.

* cited by examiner

AUTOMATED PASSENGER COUNTER SYSTEMS AND METHODS

CROSS REFERENCE TO RELATED APPLICATION

This Non-Provisional patent application claims the benefit of the filing date of U.S. Provisional Patent Application Ser. No. 62/212,083, filed Aug. 31, 2015, entitled "AUTOMATED PASSENGER COUNTER SYSTEMS AND METHODS," the entire disclosure of which is herein incorporated by reference.

BACKGROUND

The present disclosure relates to mass transit vehicle ridership counts. More particularly, it relates to automated systems and methods for estimating the number of passengers on a mass transit vehicle.

Automatic passenger counters (APCs) provide mass transit vehicle (e.g., bus) passenger boarding/alighting information associated with time and location data. APCs are a standard tool used by transit authorities to measure and report monthly ridership to the National Transportation Database (NTD), with resulting federal subsidies calculated solely based on the data they provide. Additionally, these data provide vital insight into passenger behavior and perception of bus service for purposes of service development. The most accurate APCs currently count 98% of passengers and cost approximately $8,000 per unit (each bus would have at least one unit per door) with cost proportional to accuracy. Buses provide the largest fraction of public transport servicing over 52% passenger trips in the US, and as of 2008 over 840,000 buses were registered nationwide in the United States.

Commercially available APC systems can be categorized by detection method. Sensors typically employed by known APC systems include infrared (IR) light beam cells, passive infrared detectors, video cameras, infrared cameras, laser scanners, ultrasonic detectors, microwave radars, piezoelectric mats and switching mats. Sources of inaccuracy common among all systems include improper calibration, vehicular assignment when only a few APC systems are available and the ability to analyze the volume of collected data.

The most common APC technology used by transit agencies is the IR beam break or light barrier method. This system uses multiple infrared beams crossing the door wells at the front and back of the bus providing direction and count of passengers boarding and alighting. Directionality of the passenger's movement is determined from the sequence in which the beams are broken. A passenger entering will break the beam closest to the door first, and a passenger leaving will break the beam furthest from the door first. Passenger count is stored on-board the bus until it returns to the garage where the day's data is uploaded to a database. This information is stored for multiple years and is easily accessible. Though light barrier APCs can be over 95% accurate, miscounts are known to occur when multiple people board through the same door simultaneously or from passengers boarding in close proximity to one another. IR-based APCs are also known to overestimate passenger loads by a statistically significant margin irrespective of bus type, thus an internal correction factor is generally used for passenger load estimates.

Other devised APC methods incorporate a unique pressure mat APC device consisting of a thin pressure sensor mat located on the floor near the boarding door and fare box, a microprocessor for evaluating electronic images produced from the pressure patterns of a passenger's shoe resting on the mat, and algorithms to translate mat data into people counts. Sources of error with these techniques can be caused by biased mass including passengers carrying small children, packages, bicycles or other objects aboard the transit vehicle that interfere with the mass data collected by the mat. One pressure sensor mat system was reported to be approximately 87% accurate.

Bauer, et al. ("Simple Sensors Used for Measuring Service Times and Counting Pedestrians" *Transportation Research Record: Journal of the Transportation Research Board*, Vol. 2214, No. 1, December 2001, pp. 77-84) evaluated performance of two comparatively inexpensive sensing technologies, light barrier and switching mat, for passenger count and measurement of service times at the Vienna airport, security and border checkpoints. The security checkpoint setting was seen to be a harder test case since a significant number of passengers were required to repeat the security procedure, resulting in bidirectional traffic not differentiated by the sensors. Results showed that both sensing technologies were able to obtain accurate counting for an aggregation of several hours, but flow counts for shorter time periods (5 to 15 min) were less reliable. The switching mat outperformed the light barrier sensor in the border setting and performed slightly worse in the security checkpoint setting, where the placement of the mat was not optimal. Consequently, in terms of counting passengers, the switching mat was the better system.

Peterson (*Effortless Passenger Identification System*. Washington, D.C., 2013, pp. 1-31) evaluated the technical, operational, and economic feasibility of using medium-range radio frequency identification (RFID) technology to track transit passengers on the North Dakota State University (NDSU) Transit System. The RFID tags used at NDSU were attached to the outside of student backpacks allowing for little interference between the card and the reader. Controlled tests indicated that the reader received a valid signal from the RFID card if it was in plain sight and there was no interference present. When riders boarded the bus with the card either in their pockets or against their cell phones, the read quality dropped dramatically. A card's ability to read was found to be highly dependent on the visibility to the receiver device. The analysis showed that with proper ridership numbers and varying percentages of non-student riders, RFID technology can provide an economic benefit to transit agencies. Improvements in sensor technology would improve performance. However the requirement of all riders to have a card to be counted could affect accuracy.

In light of the above, with 80% of transit agencies using APC systems and smaller authorities disproportionately using manual counts due to budgetary constraints, a need exists for systems and methods for estimating mass transit vehicle passenger counts with improved accuracy and lower costs as compared to conventional APC technology.

SUMMARY

Some aspects of the present disclosure are directed toward novel APC technology that improves upon existing systems and methods by using vehicle mass to assess boarding and alightings of passengers on transit vehicles (e.g., buses). Unlike previous APC designs employing a pressure mat method that only measures mass at the door locations, the systems and methods of the present disclosure measure the change in mass of the entire cabin optionally derived from three pressure sensors mounted in the vehicle suspension system. Vehicle passenger load is directly proportional to vehicle mass, therefore chances for miscounts can be reduced. With increased integration of existing vehicle information systems, the mass-based APC systems and methods of the present disclosure can have lower cost as compared to conventional APC systems (e.g., IR-based APC devices), and can provide additional information of interest to transit authorities such as route-specific passenger distribution within the bus (or other mass transit vehicle) or passenger load contributions to fuel consumption. This can be optionally be done, for example, through systems that integrate with existing hardware and software available on buses such as automatic vehicle location, global positioning systems (GPS) and controller area network (CAN) systems that continuously broadcast vehicle and powertrain data.

Using information or data from pressure sensors connected to a vehicle's air bag suspension system, the systems and methods of the present disclosure determine vehicle mass or weight in real time. Coupled with GPS, the vehicle CAN, microprocessor, and algorithms, the APC systems and methods of the present disclosure can temporally and geospatially determining boardings, alightings, and current passenger count or load of the vehicle on a per stop basis. The pressure from each air bag circuit can be monitored by a microcontroller on the vehicle where all of the acquisition, calculation and transmission of data occur. Spatial location of masses within the vehicle optionally along with information from an accelerometer, gyroscope, and vehicle CAN can further aid in determining passenger boarding and alighting events. In some embodiments, a calibration procedure involving placement of known masses throughout the vehicle can be used for more accurate mass and location measurements. In some embodiments, filtering techniques are used to smooth the pressure sensor input signal to minimize noise and improve accuracy. Final outputs of the systems and methods of the present disclosure can include time and location stamped passenger count, passenger miles traveled, passenger mass or weight, and distribution of mass or weight about the vehicle. Such information can then be used by transit agencies to assess their level of service and improve scheduling, for example. Federally-subsidized transit funding is based on ridership; therefore, it is imperative for authorities to report an accurate count of passengers.

The systems of the present disclosure can be installed on air ride suspension equipped mass transit vehicles with air ride suspension for the purpose of estimating passenger count. Most common transit buses, passenger trains, and light rail trains are equipped with air ride suspensions; however, the systems and methods of the present disclosure can be useful with any vehicle having an air bag suspension air circuit (e.g., three or more air bag suspension air circuits).

Other aspects of the present disclosure are directed toward computer-implemented methods for estimating vehicle passenger count. The methods include identifying occurrence of a ridership change episode, for example based upon a speed or other movements of the vehicle. A passenger count of the vehicle as of a conclusion of the ridership change episode is estimated based upon at least one sensed parameter indicative of vehicle mass. In some embodiments, the sensed parameter is based upon a signal received from one or more sensors monitoring pressure in an air bag circuit(s) of an air ride suspension system of the vehicle. In some embodiments, the passenger count estimate is based upon a correlation of additional vehicle mass with passenger count. In other embodiments, estimating passenger count includes identifying and tracking discrete passenger loading events over the course of the ridership change based on a change in the vehicle mass over time.

Other aspects of the present disclosure are directed toward an automated vehicle passenger counter system. The system includes at least one pressure sensor and a computing device. The pressure sensor is configured to monitor pressure of an air bag circuit of the vehicle, and to signal information indicative of the sensed pressure. The computing device is configured to process the signaled information and includes a processor and a memory. The memory stores written instructions that, when executed, cause the processor to identify occurrence of a ridership change episode, and to estimate a passenger count of the vehicle at a conclusion of the ridership change episode based upon the signaled pressure information.

DETAILED DESCRIPTION

Aspects of the present disclosure relate to systems and methods for automatically estimating the number of passengers on a vehicle, and are useful as an alternative to conventional APC systems. While the systems and methods of the present disclosure can be implemented with a wide range of different vehicle formats, mass transit buses or other vehicles incorporating air ride suspension are of particular relevance.

Figure 1:
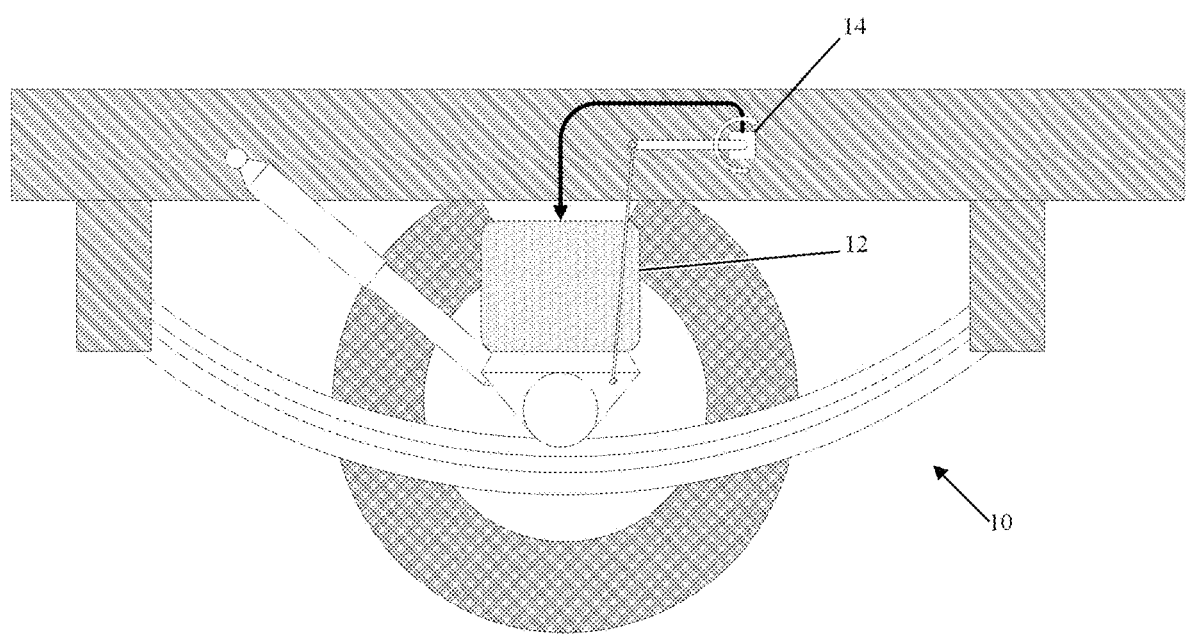
FIG. 1 is a simplified illustration of a portion of a conventional air ride suspension system.

As a point of reference, development of air ride suspension began in the late $19^{th}$ century with use on vehicles beginning in transit buses. Today, trains, buses, tractor trailers, and even passenger cars use air ride suspension with near universal adoption on mass transit as well as trucks and trailers. Modern transit buses are factory equipped with air ride suspension to provide a smooth ride to passengers while maintaining vehicle ride height. Air ride prevents bottoming out during large load changes experienced from passengers boarding or alighting (i.e., exiting) the bus. A mechanical auto-leveling valve maintains the ride height by increasing or decreasing the air pressuring inside the bag when an increase or decrease in cabin load is experienced. In other words, as passengers board the bus, pressure increases within the air suspension; alighting produces the opposite result. FIG. 1 is a simplified illustration of a conventional air suspension system 10, including an air spring 12 and a leveling valve 14.

Figure 2:
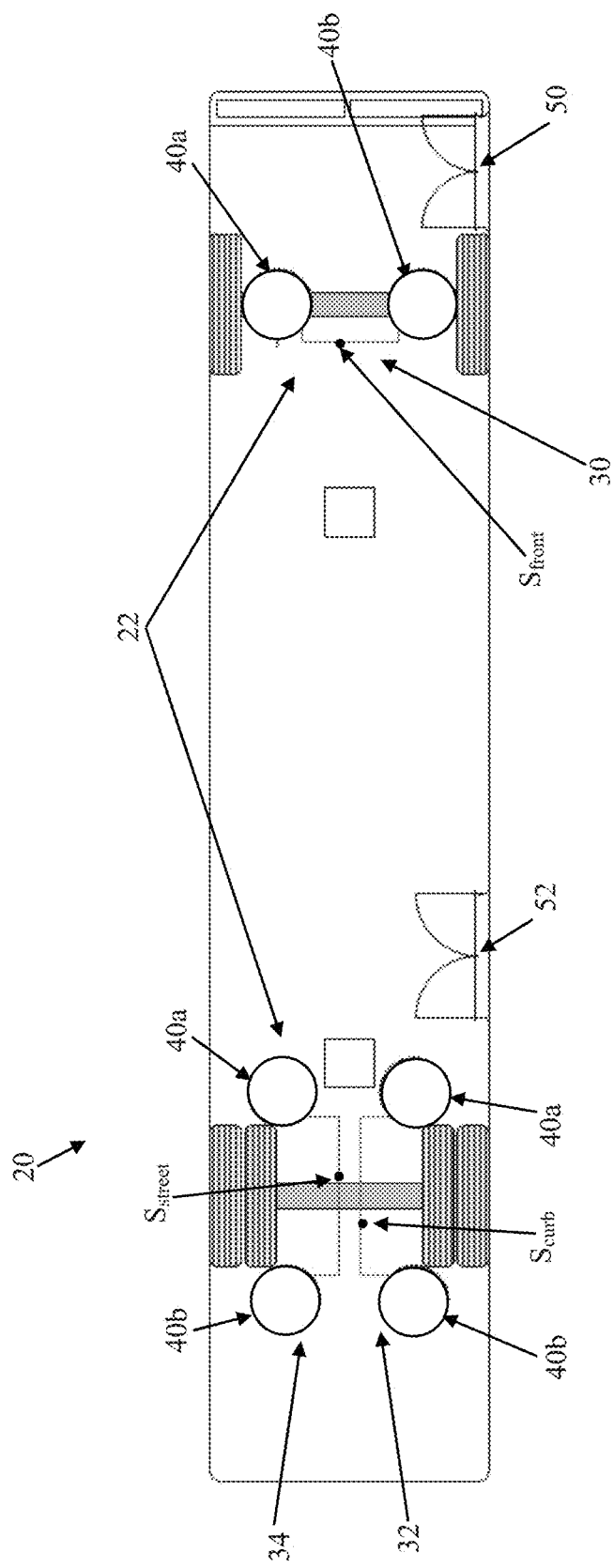
FIG. 2 is a schematic illustration of portions of a transit bus, including an air ride suspension system, along with sensors useful with the automated passenger counter systems and methods of the present disclosure.

As reflected by FIG. 2, with a typical modern transit bus 20 (e.g., on the order of forty feet in length), the entire suspension system 22 (referenced generally) consists of three air circuits 30, 32, 34 each with two connected air bags 40a, 40b. FIG. 2 shows the location and connections of each air circuit 30-34. Connections between a corresponding pair of air bags 40a, 40b indicates that air pressure is equal in the connected bags 40a, 40b. Common nomenclature when referring to sides of a bus 20 includes "curb side", which is the right side or passenger pickup side adjacent to the curb, and "street side", which is the driver's side of the vehicle. Standard forty foot buses have front 30, curb side 32, and street side 34 air bag circuits. Front and rear doors 50, 52 are also identified in FIG. 2.

With the above background in mind, in some embodiments, the systems and methods of the present disclosure automatically perform various passenger count estimates based on an overall mass of the vehicle of interest, with the mass being automatically determined as a function of one more sensed parameters of the air suspension system 22. It will be understood that the presence of passengers on or in the vehicle will affect the overall mass. As used throughout this disclosure, then, the term "unloaded vehicle mass" (or "unloaded bus mass") is defined as the mass of the vehicle (e.g., bus) alone, in the absence of any passengers. The term "vehicle mass" (or "bus mass") is defined as the combined or total mass of the vehicle (e.g., bus) and any passengers present on or in the vehicle. With this in mind, systems and methods of the present disclosure include one or more sensors configured and connected to the vehicle to signal information indicative of the vehicle mass. For example, as identified in FIG. 2, sensors $S_{front}$, $S_{curb}$, $S_{street}$ are associated with a corresponding one of the air bag circuits 30-34 and monitor a parameter of the air bag circuit 30-34, for example air pressure. The sensors $S_{front}$, $S_{curb}$, $S_{street}$ can assume various forms, and in some embodiments are each a pressure transducer (e.g., an off-the-shelf pressure transducer as known in the art) placed on the corresponding air bag circuit 30-34. As described below, vehicle mass can be determined or estimated in real time based on signaled information or data from each of the sensors $S_{front}$, $S_{curb}$, $S_{street}$. Further, by optionally knowing the contribution to overall vehicle mass from three locations, it is also possible to determine general passenger location within the vehicle 20. Since the air suspension system 22 is independent of activity at the doors 50, 52, bidirectional and multiple boarding events are distinguishable when mass is known as a function of time. In other embodiments, information from less than all of the air bag circuits 30-34 can be monitored and/or acted upon in determining vehicle mass and/or estimating passenger count.

Figure 3:
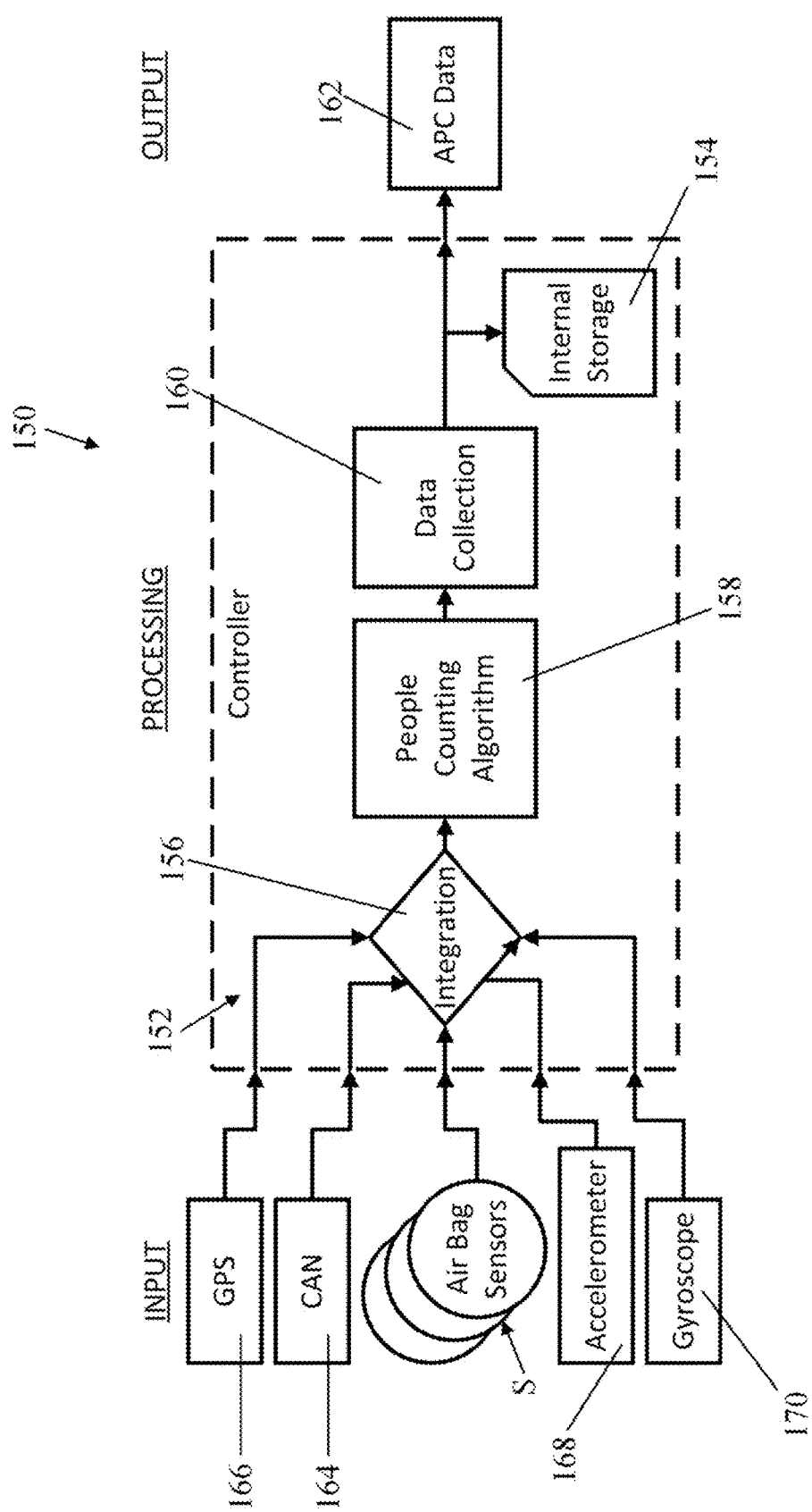
FIG. 3 is a block diagram of an automated passenger counter system in accordance with principles of the present disclosure.

As shown in FIG. 3, the sensors $S_{front}$, $S_{curb}$, $S_{street}$ (collectively identified as "S" in FIG. 3) are provided as part of an automated passenger count estimating system 150 in accordance with principles of the present disclosure. The system 150 further includes a controller or computing device 152. In general terms, the controller 152 can be any conventional computing device including one or more processors or microprocessors as known in the art and configured to operate according to executable instructions (e.g., program code), and can store information within and/or retrieve stored information from a memory 154 (e.g., RAM, SRAM, ROM, EPROM, flash drive, hard drive, etc.). The controller 152 further maintains or acts upon various modules, such as an integration module 156, a people counting algorithm module 158, and a data collection module 160. In some embodiments, the controller 152 is optionally configured to communicate with other devices or systems 162, and can include a transmitter and optionally a receiver as known in the art (appropriate, for example, for wireless communications such as a cellular card). The sensors S are electronically connected to the integration module 156 (wired or wireless). The system 150 can optionally act upon other information or data. For example, FIG. 3 reflects that information (e.g., vehicle speed) from a common area network (CAN) 164 of the vehicle can be provided to the integration module 156. Further, position information can be acted upon, such as a Global Position System 166 provided with the vehicle or as part of the system 150. Other optional sources of information that can be acted upon by the system 150 include an accelerometer 168, gyroscope 170, etc.

As described below, the modules 156-160 are programmed to effectuate performance of methods of the present disclosure. In general terms, the modules 156-160 provide instructions or algorithms (e.g., executable program code written in any known programming language such as Java, C++, etc.) to be executed by the microprocessor of the controller 152. The modules 156-160 can comprise executable program code stored in a computer-readable storage device (e.g., the memory 154) for execution by the microprocessor. As other examples, the modules 156-160 can comprise software, firmware or, in some examples, may be implemented in discrete logic. In other embodiments, the techniques described below can be executed by specifically programmed circuitry of the microprocessor.

With cross-reference between FIGS. 2 and 3, using knowledge of the air suspension's correlation with vehicle load and the connection between the paired bags 40a, 40b of each air bag circuit 30-34, the vehicle mass can be determined or estimated based on information signaled by one or more of the sensors $S_{front}$, $S_{curb}$, $S_{street}$ by the integration module 156 (and/or other modules) in various fashions. In some embodiments, the integration module 156 is programmed to account for properties of the air bags 40a, 40b that might otherwise affect signaled information (e.g., air bag surface area, induced pressure from the air bag's elastic rubber membrane, etc.) in determining or calculating the vehicle mass $m_{veh}$. For example, in some embodiments, the vehicle mass $m_{veh}$ is determined using Equations 1 and 2 below. Equation 1 gives the gives the measured mass of the vehicle $m_m$ where $A_{front}$, $A_{curb}$, $A_{street}$ are the effective air bag surface areas of the front, curb, and street side air bags 40a, 40b, respectively; $P_{front}$, $P_{curb}$, $P_{street}$ is the pressure measured in each respective airbag circuit 30-34 via information signaled by the corresponding sensor $S_{front}$, $S_{curb}$, $S_{street}$. Equation 2 relates the measure mass of the vehicle $m_m$ to the actual vehicle mass $m_{veh}$ accounting for pressure induced from the elastic rubber membrane of each of the air bags 40a, 40b. The constant b is the proportion between known mass change and measured mass change. The constant K is the constant difference between the known mass and the actual mass. The values of the constants $A_{front}$, $A_{curb}$, $A_{street}$, b and K can be found using a calibration procedure, such as the non-limiting example calibration procedure described below.

$$m_m = A_{front} * P_{front} + A_{curb} * P_{curb} + A_{street} * P_{street} \quad (1)$$

$$m_{veh} = b * m_m + K \quad (2)$$

The vehicle mass $m_{veh}$ can be estimated or determined from information signaled by the sensors $S_{front}$, $S_{curb}$, $S_{street}$ in other manners using other algorithms or equations in accordance with principles of the present disclosure. Where Equations 1 and 2 are employed, the coefficients for mass can be determined in various ways, for example by a static calibration procedure. One exemplary static calibration procedure can include loading the vehicle with known mass to measure the corresponding airbag pressures. Pressure measurements with the vehicle unloaded (no passengers) are taken first, followed by incrementally increasing the vehicle mass in known amounts and monitoring the effect on the measured mass $m_m$ (e.g., increasing the vehicle mass in increments of 113 kg (250 lbs)) up to 454 kg (1000 lbs)). This process can be repeated over the front, the street side, and the curb side air bag circuits 30-34 to provide the largest variability in mass distribution and enough measurements to solve for $A_{front}$, $A_{curb}$, $A_{street}$ in Equation 1 using matrix multiplication. With reference to a known unloaded vehicle mass of the vehicle, the coefficients b and K can be found using the calibration data as input into Equation 2.

In some embodiments, the algorithm(s) utilized to determine vehicle mass $m_{veh}$ account for possible kneeling of the vehicle. By way of reference, many transit buses periodically operate an on-board "kneeling valve" to deflate the air bags 40a, 40b of the front air bag circuit 30, lowering the bus to the curb to make boarding and alighting easier (the on-board air compressor is subsequently operated to re-inflate the air bags 40a, 40b); this is known as "kneeling". In these kneeling events, the collective air bag circuit pressure information may no longer be an accurate measure of vehicle mass due to the resulting negative excess-mass values. However, even when the front air bag circuit 30 is deflated during kneeling, the two rear air bag suspension circuits 32, 34 are still inflated and active, providing information from which the changing vehicle load can be determined using an adjusted algorithm. Alternatively and/or in addition, the algorithms utilized with the people counting algorithm module 158 (described below) can be selected to account for kneeling events.

Figure 4:
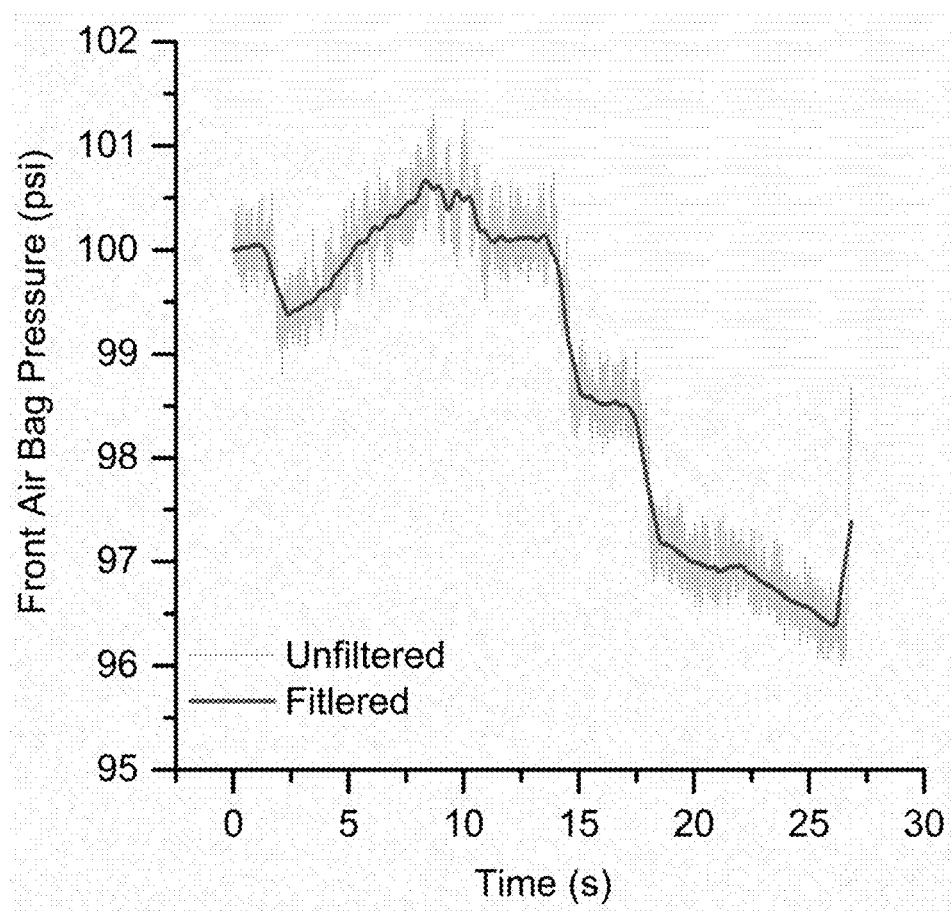
FIG. 4 is a graph illustrating an example of filtered versus unfiltered pressure transducer signals.

The integration module 156 (or other components of the systems of the present disclosure) can optionally perform filtering and/or processing of the raw data generated by the sensors $S_{front}$, $S_{curb}$, $S_{street}$ to, for example, reduce signal noise. In some embodiments, each of the three pressure transducer signals $S_{front}$, $S_{curb}$, $S_{street}$ can be processed through a lowpass filter (e.g., a Savitzky-Golay smoothing lowpass filter) using a local least squared polynomial approximation to reduce signal noise. FIG. 4 shows an example of filtered versus unfiltered pressure transducer data. Reducing signal noise can help improve the quality of the inputs to the vehicle mass algorithm(s) (e.g., Equations 1 and 2 above). The three filtered pressure transducer signals can then be used as inputs to Equations 1 and 2 (or other equations) to produce instantaneous vehicle mass. A possible byproduct of determining vehicle mass from three separate signals is a small high frequency fluctuation in the mass output inconsistent with passenger boarding. In some embodiments, the systems and methods of the present disclosure optionally mitigate this potential mass calculation artifact by using a lowpass filter with a lower cutoff frequency of 1 Hz derived from the approximate boarding event duration of 1 second. Other estimated boarding event duration times can alternatively be addressed. Similarly, other raw data filtering and processing techniques can be implemented by the systems and methods of the present disclosure. For example, information generated by the accelerometer 168 (FIG. 3) and/or the gyroscope 170 (FIG. 3) optionally provided with some non-limiting embodiments can be utilized to measure linear accelerations as well as pitch, yaw and roll of the vehicle. This information, in turn, can be incorporated into the algorithm(s) of the present disclosure to compensate for, and filter out, highly transient pressure signals (e.g., pressure traces) resulting from road-induced vibration and/or cabin sway using a dynamic model of the system. In yet other embodiments, raw data from the sensors $S_{front}$, $S_{curb}$, $S_{street}$ is not subjected to filtering/processing.

Returning to FIGS. 2 and 3, regardless of how the sensor information is processed and how the vehicle mass $m_{veh}$ is determined, the people counting algorithm module 158 is configured to provide instructions or algorithms to be executed by the microprocessor to estimate or calculate the number of passengers on the vehicle based on the determined vehicle mass $m_{veh}$. Some of the methodologies implicated by the present disclosure are described in greater detail below. In general terms, the controller 152 is configured or programmed (e.g., via instructions from the people counting algorithm module 158 or other programming provided with the controller 152) to execute a passenger count estimation operation upon occurrence of a possible ridership change episode in which one or more passenger boardings or alightings (passenger events) occur. With this in mind, rather than continuously or constantly estimating passenger count, some systems and methods of the present disclosure are configured or programmed to perform a passenger count estimate operation based upon a speed or sensed movement of the vehicle (as implicated, for example, by information from the vehicle CAN 164), for example when the vehicle speed is zero or is below a speed threshold value as described below. Other sensed information indicative of vehicle speed or movement can alternatively be referenced in designating the occurrence of a possible ridership change episode, such as information generated by an accelerometer, gyroscope, etc., provided with the system 150 and/or with the vehicle.

In one embodiment, the methods implemented by the people counting algorithm module 158 for estimating passenger count correlate additional vehicle mass with passenger count ("Additional Mass Method"). For example, according to Equation 3 below, the current passenger count $L_C$ (i.e., the estimated number of passengers on the vehicle at a certain point in time) is determined as a function of the determined vehicle mass $m_{veh}$, the unloaded vehicle mass $m_{curb}$ and a constant $m_p$ representative of an approximated or assumed average passenger weight.

$$L_C = \text{Round}\left(\frac{m_{veh} - m_{curb}}{m_p}\right) \qquad (3)$$

The designated passenger weight constant $m_p$ can be a pre-determined value, or can be selected by a user. By way of example, in some embodiments the passenger weight constant $m_p$ can be in the range of 68-91 kg (150-200 lbs), such as 76 kg (168 lbs).

The Additional Mass Method can be implemented by the system 150 in various manners. In some embodiments, the people counting algorithm module 158 is configured or programmed to perform the passenger count estimate routine via the Additional Mass Method after each vehicle stop. For example, when the reviewed information otherwise indicative of vehicle speed or movement (e.g., from the vehicle CAN 164, the accelerometer 168, the gyroscope 170, etc.) implicates that the vehicle speed or movement has dropped below a certain value and later exceeds the certain value and/or that the vehicle has come to a complete stop and later begins moving, occurrence of a ridership change episode is identified, and the controller 152 is prompted to perform the passenger count estimate operation as described above. The determined vehicle mass $m_{veh}$ as employed for Equation 3 is as of the point in time the particular ridership change episode is determined to have ended. By way of one non-limiting example, each time the vehicle is determined to have stopped and then begin moving, the determined vehicle mass $m_{veh}$ for Equation 3 is as of the time the vehicle begins to move. As a point of reference, because in some embodiments the passenger count estimates generated by the Additional Mass Method are based upon information acquired just before and just after a vehicle stop, possible kneeling events are of minimal concern and need not necessarily be considered.

Figure 5:
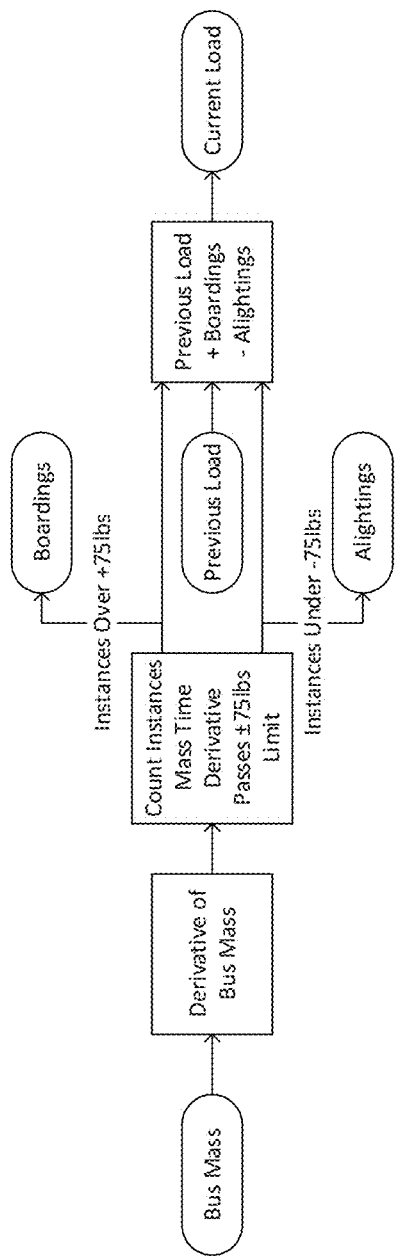
FIG. 5 is a block diagram of mass change even logic useful with systems and methods of the present disclosure.
Figure 6:
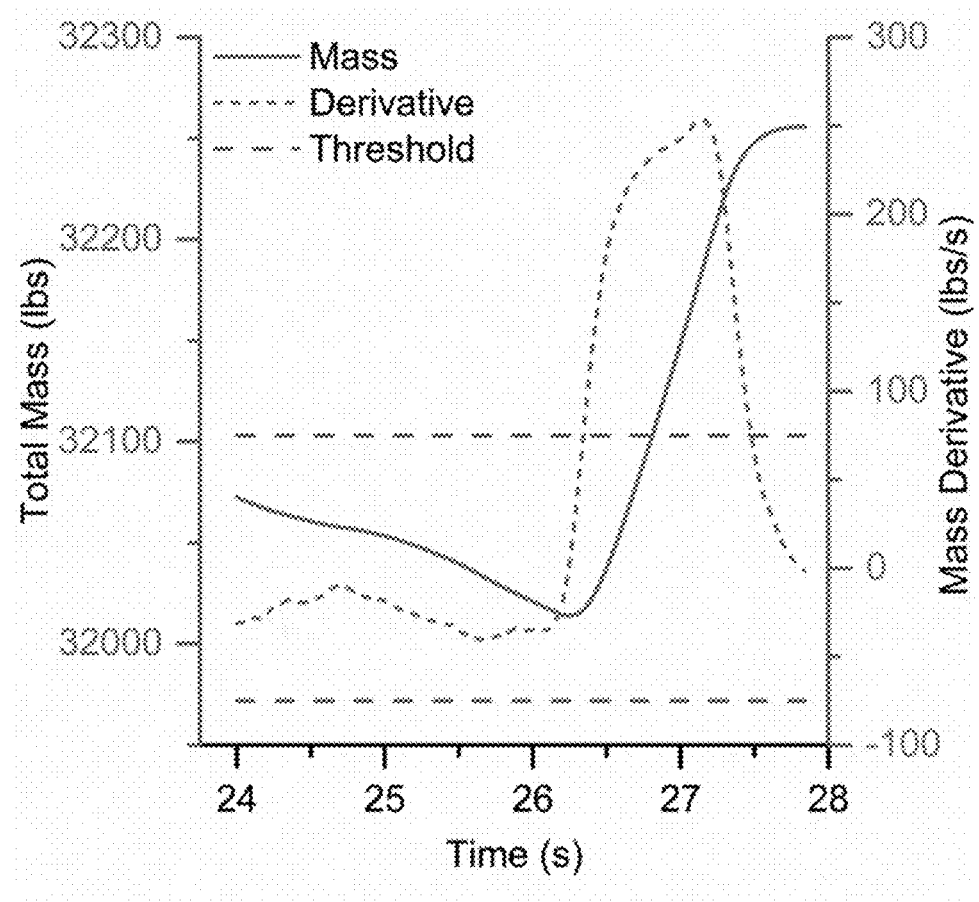
FIG. 6 is plot of an example of a time derivative of a mass trace generated by systems and methods of the present disclosure and implicating a passenger boarding event.

In another embodiment, the methods implemented by the people counting algorithm module 158 identify and track individual passenger loading events during the ridership change episode based on a change in the vehicle mass $m_{veh}$ over time ("Event-Based Method"). Counting individual mass change events can be made with reference to the time derivative of a trace of the vehicle mass $m_{veh}$ over the course of the ridership change episode. When the derivative exceeds a first passenger event threshold, a boarding event is designated. Similarly, when the derivative goes below a second passenger event threshold, an alighting event is counted. The current passenger count is then determined from the sum of the previous passenger count (i.e., the estimated passenger count immediately prior to the onset of the particular ridership change episode), the total number of boarding events, and the total number of alighting events. The first and second passenger event thresholds can be pre-determined or can be selected by a user, and generally correspond to a minimum weight to mass of most passengers. For example, in some embodiments the first passenger event threshold can be on the order of +34 kg/s (+75 lbs/s) and the second passenger event threshold can be on the order of −34 kg/s (−75 lbs/s), although other values are equally acceptable. FIG. 5 illustrates one embodiment of the logic for the Event-Based Method using +75 lbs/s as the first passenger event threshold and −75 lbs/s as the second passenger event threshold. Further, FIG. 6 is an example of an optimal scenario in which a passenger boarding event is identified in the time derivative of the mass trace.

With the Event-Based Method, it may be useful to sample the sensor data at an elevated rate. For example, 100 Hz data can be beneficial with the Event-Based Method to give a high resolution view of mass change events not otherwise possible with the stop aggregated information provided with the Additional Mass Method.

Returning to FIGS. 2 and 3, the Event-Based Method can be implemented by the system 150 in various manners. In some embodiments, the people counting algorithm module 158 is configured or programmed to perform the passenger count estimate routine via the Event-Based Method during or for an identified ridership change episode. For example, when the reviewed information otherwise indicative of vehicle speed or movement (e.g., from the vehicle CAN 164, the accelerometer 168, the gyroscope 170, etc.) implicates that the vehicle speed or movement has dropped below a certain threshold value and later exceeds the threshold value, occurrence of a ridership change episode is identified, and the controller 152 is prompted to perform the passenger count estimation operation as described above for the time period of the ridership change episode. By way of one non-limiting example, each time a speed of the vehicle is determined to have dropped below 4.8 kph (3 mph) and then increased above 4.8 kph (3 mph), a ridership change episode can be designated and the Event-Based Method analysis applied to the trace of the vehicle mass $m_{veh}$ over the time period of the ridership change episode.

In some embodiments, the Event-Based Method can be adapted to account for a kneeling event. Under normal or non-kneeling event operations of the vehicle, the Event-Based Method algorithms as described above can be employed. When a kneeling event is detected (e.g., such as by the vehicle CAN 164), secondary Event-Based Method algorithms are utilized that review pressure information from only the rear air bag circuits 32, 34 (i.e., information from the front air bag circuit 30 is excluded). Passengers boarding or alighting at the rear of the vehicle will register as large positive or negative pressure changes, respectively. Passengers boarding or alighting at the front of the vehicle will register as small, abrupt increases or decreases in the rear air bag circuit pressure. With this approach, possible errors in the Event-Based Method weight equation(s) during a kneeling event due to loss of pressure in the front air bag circuit 30 are avoided.

Other algorithms for estimating passenger count based on mass-related information implicated by the sensors S are also envisioned. For example, in some embodiments, a combination of the Additional Mass Method and the Event-Based Method can be employed. With some of these non-limiting embodiments, a probabilistic approach is utilized to identify optimal scenarios for each algorithm and assigning an error to that calculation. For example, the people counting module 158 can be programmed to simultaneously derive preliminary passenger count estimates for a particular ridership change episode via the Additional Mass Method and the Event-Based Method. The module 158 is further programmed to assign a count scenario rating (e.g., high count scenario or low count scenario) to the particular ridership change episode based upon the preliminary passenger count estimates. For example, where one or both of the preliminary count estimates is above a pre-determined value (e.g., 10 or other value indicative of a mass boarding or alighting, etc.), the particular ridership change episode is designated as a high count scenario. Various other factors can be incorporated into the count scenario rating. Regardless, based upon the assigned count scenario rating, a final passenger count estimate is assigned to the particular ridership change episode from the previously determined passenger count estimates. For example, for low count scenario ridership change episodes, the passenger count estimate generated by the Event-Based Method is assigned as the final passenger count estimate for the particular ridership change episode; conversely, the passenger count estimate generated by the Additional Mass Method is used for high count scenario ridership change episodes. Alternatively, the count scenario rating can be applied as an additional weighting factor in the algorithm(s) associated with the Event-Based Method and/or the Additional Mass Method. In yet other embodiments, an accounting of passengers can be used to determine or estimate the likelihood that a pre-identified passenger alighted at a particular ridership change episode.

The data collection module 160 is optionally configured or programmed to correlate various information with each respective estimated passenger count. For example, one or more of the location of the vehicle at the time of the corresponding passenger count estimate, the time of day of the corresponding passenger count estimate, the duration of the ridership change episode corresponding with the passenger count estimate, etc., can "stamped" or otherwise associated with the particular estimated passenger count for further evaluation. Alternatively or in addition, the distance between identified ridership change episodes (thus indicative of passenger miles traveled) can be determined and stored, as can passenger mass and distribution of mass within the vehicle. Regardless, all information can then be stored in the memory 154.

In some embodiments, the controller 152 is maintained as a unit mounted to the vehicle in question. That is to say, the various analyses described above are performed by a computing device carried by the vehicle itself, with the resulting passenger count and related information being exported or down-loaded to the external device or system 162. In other embodiments, raw sensor data (or filtered sensor data) is collected and stored (permanently or temporarily) by a memory or similar device mounted to or provided with the vehicle in question, and then exported to an external device that is programmed with at least the people counting algorithm module 158 described above. In other words, the above-described functions of the controller 152 can be divided between two or more separate computing devices.

EXAMPLES AND COMPARATIVE EXAMPLE

Experiments were performed to validate the automated passenger count estimate systems and methods of the present disclosure. In particular, permission to work with an in-service Low Floor GILLIG forty foot mass transit bus operated by Twin Cities Metro Transit (serving the areas of Minneapolis and St. Paul, Minn.) was obtained. The bus was equipped with a GILLIG Air Ride front suspension system. A factory-installed IR beam APC system (Trapeze Transit Master Automatic Passenger Counter) was provided with the Metro Transit bus, as was a video recording system deployed to record passenger activities at both the front and rear doors 50, 52.

Three pressure sensors $S_{front}$, $S_{curb}$, $S_{street}$ were installed to the bus as shown in FIG. 2. Pressure from each air bag circuit was measured using an onboard National Instruments C-RIO microcontroller programmed to collect pressure sensor data at a 100 Hz rate as well as 1 Hz aggregated data. 100 Hz data was only collected at vehicle speeds of less than 4.8 kph (3 mph) as determined by the CAN signal of the bus. Pressure data combined with CAN and GPS data was stored locally and sent using a cellular card for real time remote processing. The signal flow was akin to that reflected by FIG. 3.

Figure 7:
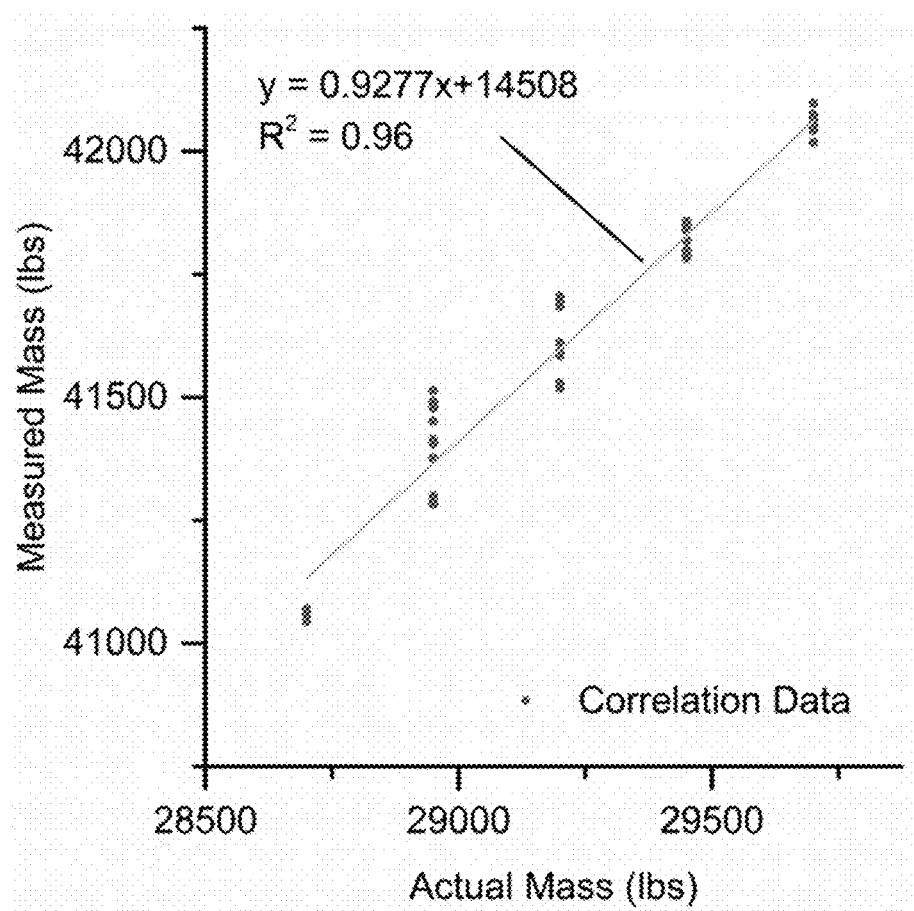
FIGS. 7-10 are plots of information obtained during experiments described in the Examples section of the present disclosure.

To determine the coefficients used in the vehicle mass calculations of Equations 1 and 2, the static calibration procedure described above was employed. After calibrating the bus, a test run was made around the block with one boarding and alighting event to make sure everything was working properly. The calibration process is similar to that used for IR beam sensors where manual counts are required determining boarding and alighting correction factors. The results of the static calibration procedure are shown in FIG. 7. The resulting trendline equation is the calibrated form of Equation 2 where y is $m_{veh}$ and x is $m_m$, and the coefficients 0.9277 and 14,508 are b and K, respectively. FIG. 7 indicates that measure mass from air bag pressure has a linear relationship with actual loading.

The Metro Transit bus was then operated under normal conditions for one day, servicing passengers along Metro Transit route 675 (service between Minneapolis and Mound, Minn.). Over the course of one day, the bus repeated the route four times. Metro Transit route 675 was selected for the experiment due to its wide range of driving conditions so as to cover the different types of settings a transit bus encounters. Features of the route include slow city driving with frequent stops, high speed highway sections, and suburban service with long distances between stops. Data from the sensors $S_{front}$, $S_{curb}$, $S_{street}$ was monitored and passenger count estimates were determined by both the Additional Mass Method and the Event-Based Method as described above. The standard passenger mass $m_p$ utilized for the Additional Mass Method was 76 kg (168 lbs). With the Event-Based Method, the first passenger event threshold was +34 kg/s (+75 lbs/s) and the second passenger event threshold was 34 kg/s (−75 lbs/s). Time and location information were recorded or "stamped" with each estimated passenger count. Passenger miles traveled were determined, along with passenger mass and distribution of mass within the bus. Passenger counts generated by the IR beam APC system were recorded over the same time period. Finally, the video footage was manually reviewed to validate actual passenger count.

Figure 8:
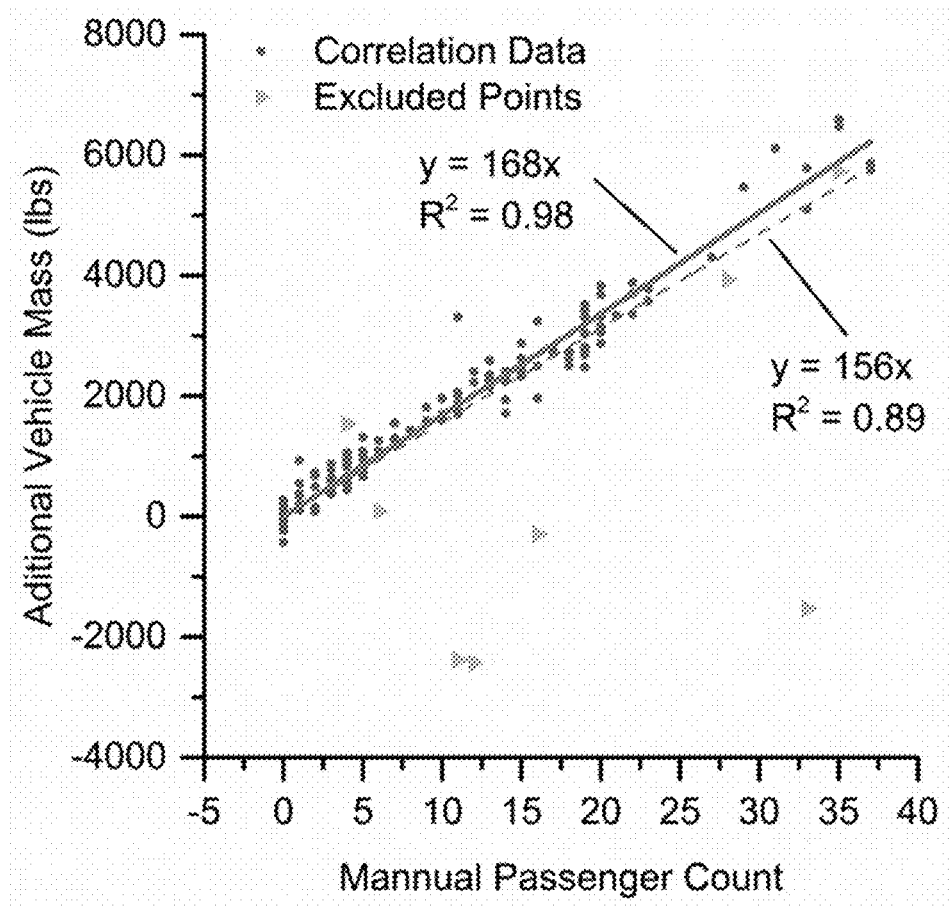

FIG. 8 provides a comparison of the estimated passenger counts determined by the Additional Mass Method with manual passenger count (obtained by reviewing the video footage) for the on-route testing. Each data point in the plot of FIG. 8 represents an individual bus stop ridership change episode. Vehicle mass and passenger count are linearly correlated. Excluded data shown in the plot of FIG. 8 were determined to be erroneous points resulting from the bus deflating its front air bags when kneeling. Eliminating data from kneeling events gave a higher residual value for the linear fit line. Average passenger mass, given by the slope of the line, also increased.

Figure 9:
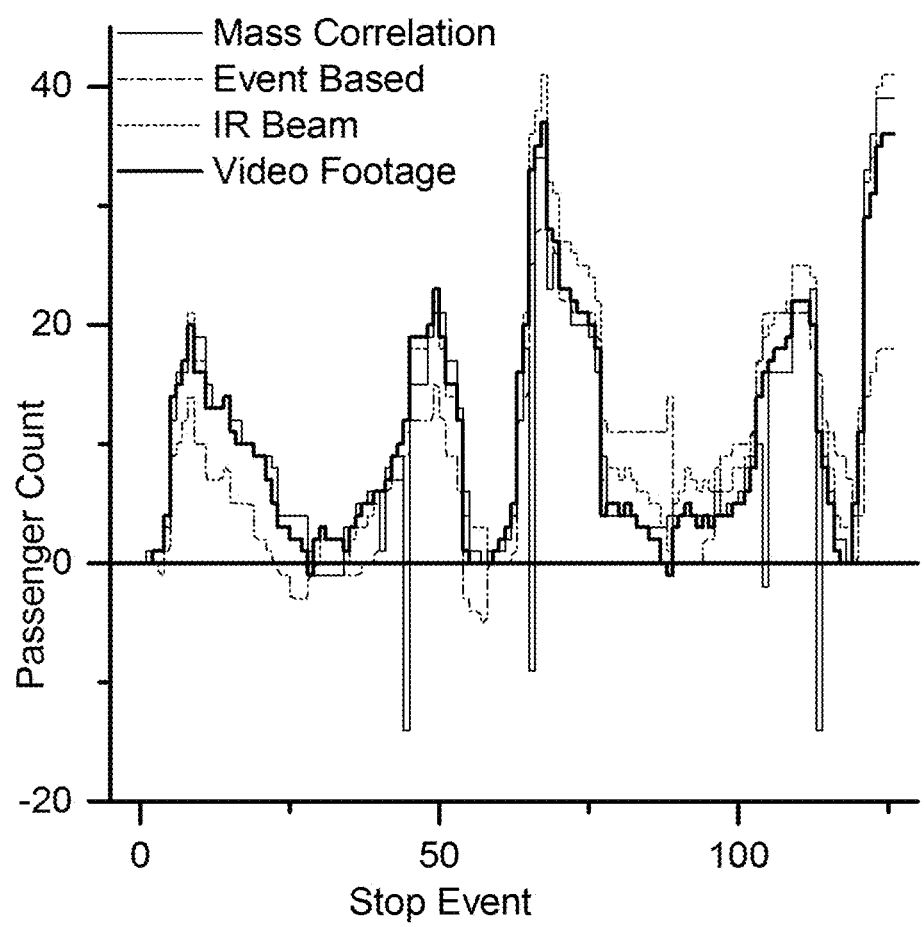

The Event-Based Method was viewed as compensating for the Additional Mass Method's possible deficiencies in "measuring" passengers during kneeling events. Discrete boarding and alighting events were counted when the derivative of the vehicle mass crossed a threshold of plus or minus 34 kg/s (75 lbs/s). The results of both Methods, along with the manual count and IR beam APC count are shown as cumulative trip passenger count in FIG. 9. Both the IR beam and Event-Based Method counts were artificially set to zero at the end of each pass of the bus route so error would not compound from one pass to the next.

The information obtained and values generated by the above testing revealed that the factory-installed IR beam APC followed passenger count patterns accurately, but the total count per route pass was consistently overestimated. The IR beam APC passenger count was unaffected by bus kneeling events (as it does not depend on the pressure in air bags). Possible causes of error included passengers standing in the rear doorway when no seats were available, and passengers bringing bikes or other large personal belonging on to the bus that cause the IR beam APC to over-count the number of passengers. The estimated passenger counts generated by the Additional Mass Method closely matched actual counts as established by the video footage; however, if the average passenger mass deviated significantly from 76 kg (168 lbs), miscounts resulted. Also, passenger counts with the Additional Mass Method were affected by the kneeling of the bus. The Event-Based Method underreported passenger numbers, but did improve passenger count estimate accuracy during kneeling events as comparted to the Additional Mass Method.

Table 1 shows the error of the three passenger count methodologies compared to the manual count for the entire test period (using an error quantifying equation from Kuutti, J., *A Test Setup for Comparison of People Flow Sensors*; Aalto University, 2012). The Additional Mass Method was the most accurate, followed by the IR beam APC. The Event-Based Method was least accurate, likely resulting from multiple stops where closely-spaced boarding occurred. Instances where several passengers boarded in rapid succession produced a single derivative peak, causing the Event-Based Method to "count" many actual boardings as one.

TABLE 1

|  | Manual Count | IR beam APC | Event Based Mass APC | Additional Mass APC |
|---|---|---|---|---|
| Average % Error | 0.00% | 17.50% | −28.23% | −2.38% |

Figure 10:
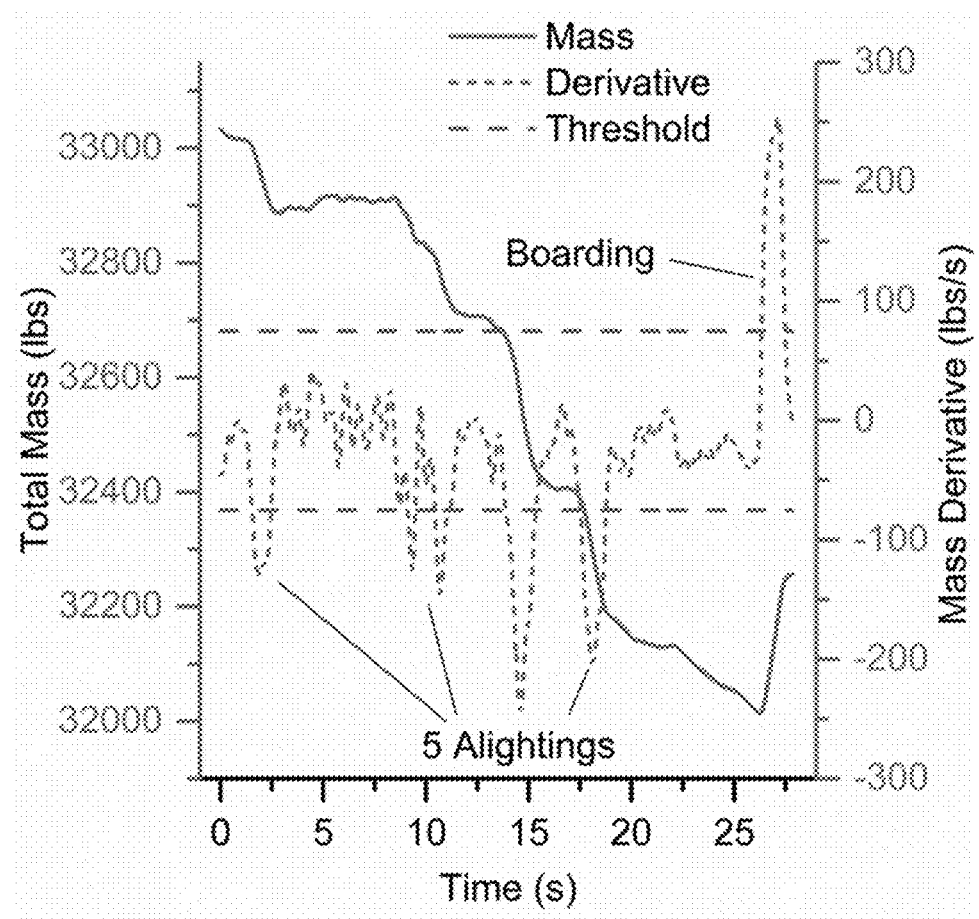

FIG. 10 represents an instance where all passenger count methods were in agreement. FIG. 10 shows total bus mass in black and its time derivative in blue for the five alightings followed by one boarding event. The red lines are the thresholds the time derivative must cross to "count" a boarding or alighting event. From the manual video review, passengers quickly entered and exited the bus from the front, giving the distinct spikes in the derivative of the mass trace.

The automated passenger count systems and methods of the present disclosure provide a marked improvement over previous designs. Using pressure data collected from a vehicle's air ride suspension system to determine vehicle mass and then estimating passenger count from this determined vehicle mass is a novel way for providing transit agencies insight into ridership of their buses (or other transit vehicles) on a highly cost-effective basis. The systems and methods of the present disclosure make use of an existing air bag suspension system that is otherwise nearly universally adopted among transit buses (and other forms of mass transportation vehicles). In some embodiments, the systems of the present disclosure utilize off-the-shelf pressure sensors and inexpensive microcontrollers, thus minimizing the number of parts and total system cost. In addition to passenger count, the systems and methods of the present disclosure are optionally adapted to triangulate passenger locations and weight distribution from the three (or more) pressure sensors installed on the vehicle.

Although the present disclosure has been described with reference to preferred embodiments, workers skilled in the art will recognize that changes can be made in form and detail without departing from the spirit and scope of the present disclosure.

What is claimed is:

1. A computer-implemented method for estimating vehicle passenger count of a vehicle including an air ride suspension system having a first air bag circuit, the method comprising:
   identifying occurrence of a first ridership change episode; and
   estimating a first passenger count of the vehicle at a conclusion of the first ridership change episode based upon at least one sensed parameter indicative of vehicle mass;
   wherein the step of estimating includes:
      reviewing a signal from a sensor associated with the first air bag circuit, the signal being indicative of a current pressure in the first air bag circuit,
      determining the vehicle mass at a conclusion of the first ridership change episode as a function of the current air pressure of the first air bag circuit at a time of the conclusion of the first ridership change episode,
      reviewing a mass trace indicative of a continuously-determined vehicle mass during the first ridership change episode as a function of the current air pressure of the first air bag circuit,
      identifying individual passenger loading events implicated by the mass trace.

2. The method of claim 1, wherein the step of estimating further includes comparing the vehicle mass with an unloaded vehicle mass.

3. The method of claim 2, wherein the step of estimating further includes establishing an estimated passenger count at the conclusion of the first ridership change episode as a function of the determined vehicle mass, the unloaded vehicle mass, and a constant representative of an average passenger mass.

4. The method of claim 1, wherein the step of identifying includes reviewing a time derivative of the mass trace.

5. The method of claim 4, wherein the step of identifying further includes designating occurrence of a passenger boarding event when the time derivative exceeds a first passenger event threshold, and designating occurrence of a passenger alighting event when the time derivative is below a second passenger event threshold.

6. The method of claim 5, wherein the step of estimating further includes assigning the first passenger count based upon a comparison of a total number of designated passenger boarding events and total number of designated passenger alighting events over the first ridership change episode with a passenger count of the vehicle immediately prior to the first ridership change episode.

7. The method of claim 1, further comprising:
   identifying occurrence of a second ridership change episode;
   estimating a second passenger count of the vehicle at a conclusion of the second ridership change episode based upon at the least one sensed parameter indicative of vehicle mass as of a time of the conclusion of the second ridership change episode;
   storing the estimated first passenger count in a memory along with information correlating the first ridership change episode with the estimated first passenger count; and
   storing the estimated second passenger count in the memory along with information correlating the second ridership change episode with the estimated second passenger count.

8. The method of claim 7, wherein the information includes at least one of time of day of the corresponding ridership change episode, length of time of the corresponding ridership change episode, and location of the vehicle.

9. The method of claim 7, wherein the memory storing the estimated passenger counts and correlating information is carried by the vehicle, the method further comprising:
   outputting the stored estimated passenger counts and correlating information to an electronic device apart from the vehicle.

10. The method of claim 7, wherein the steps of estimating and storing are performed by a computer device located apart from the vehicle.

11. The method of claim 1, wherein the step of identifying further comprises:
   assigning a start time to the first ridership change episode; and
   assigning an end time to the first ridership change episode, the assigned end time being at a later point in time than the assigned start time;
   and wherein the step of estimating a first passenger count includes reviewing the at least one sensed parameter indicative of vehicle mass at the assigned end time.

12. The method of claim 1, wherein the step of identifying occurrence of a first ridership change episode includes determining that a speed of the vehicle has dropped below a threshold value followed by a speed of the vehicle has increased above the threshold value.

13. An automated vehicle passenger counter system comprising:
- a pressure sensor configured for sensing and signaling information indicative of pressure in an air bag circuit of a vehicle; and
- a computing device configured to process the signaled pressure information, the computing device comprising a processor and a memory that stores instructions which, when executed, cause the processor to:
  - identify occurrence of a ridership change episode based upon a speed of the vehicle,
  - prompt performance of a passenger count estimation routine in response to the identified occurrence of a ridership change episode,
  - estimate a passenger count of the vehicle at a conclusion of the ridership change episode based upon the signaled pressure information, including:
    - estimate a vehicle mass at a conclusion of the ridership change episode as a function of a current air pressure of the air bag circuit at a time of the conclusion of the ridership change episode,
    - review a mass trace indicative of a continuously-determined vehicle mass during the ridership change episode as a function of the current air pressure of the air bag circuit, and
    - identify individual passenger loading events implicated by the mass trace.

14. The system of claim 13, wherein the instructions, when executed, further cause the processor to establish an estimated passenger count at the conclusion of the ridership change episode as a function of the estimated vehicle mass, an unloaded vehicle mass, and a constant representative of an average passenger mass.

\* \* \* \* \*